United States Patent [19]

Cantwell

[11] Patent Number: 4,562,501
[45] Date of Patent: Dec. 31, 1985

[54] TRANSDUCER SUPPORT APPARATUS

[76] Inventor: Gill Cantwell, 2434 Purdue Ave., #17, Los Angeles, Calif. 90064

[21] Appl. No.: 431,481

[22] Filed: Sep. 30, 1982

[51] Int. Cl.$^4$ ............................................. G11B 21/24
[52] U.S. Cl. .................................................... 360/109
[58] Field of Search .................... 360/105, 106, 97-99, 360/109

[56] References Cited

U.S. PATENT DOCUMENTS 4,052,746  10/1977  Weller .................................. 360/109
4,133,015  1/1979  Butsch .................................. 360/109

OTHER PUBLICATIONS

IBM TDB; vol. 21, No. 12, May 1979, pp. 4781–4782; "Head Adjustment for Disk"; Bauck, Kellow, & Norwood.

Primary Examiner—A. J. Heinz
Attorney, Agent, or Firm—Nilsson, Robbins, Dalgarn, Berliner, Carson & Wurst

[57] ABSTRACT

First and second transducer support arms positioned upon a carriage means for positioning a first and second transducer on opposite sides of a floppy disc. Adjusting means provided for linearly and transversely adjusting a transducer to properly position the two transducers with respect to the rotating magnetic floppy disc.

26 Claims, 19 Drawing Figures

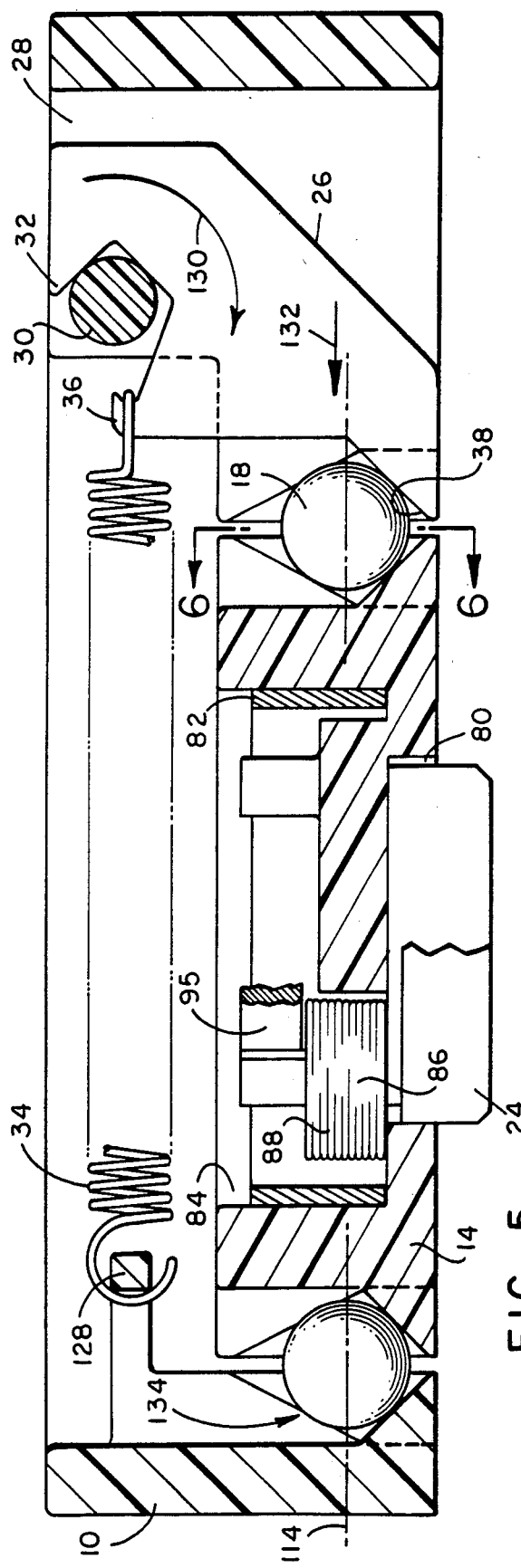
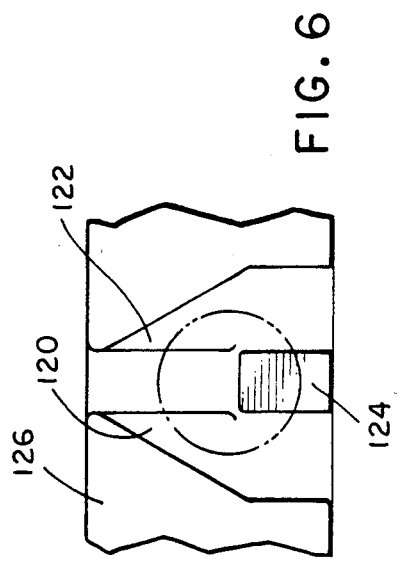
FIG. 5
FIG. 6

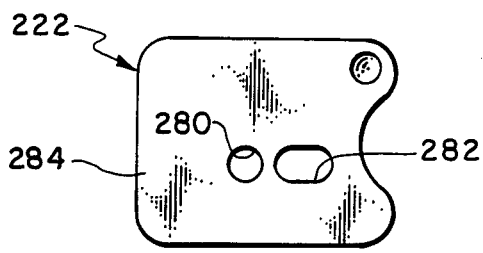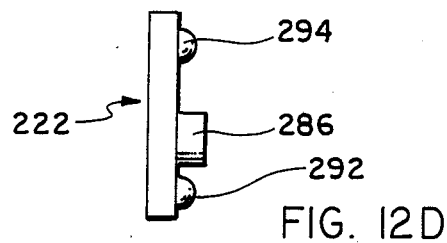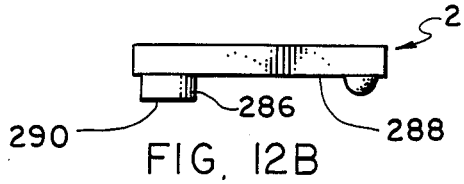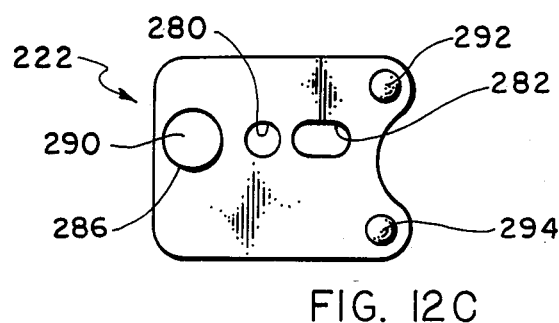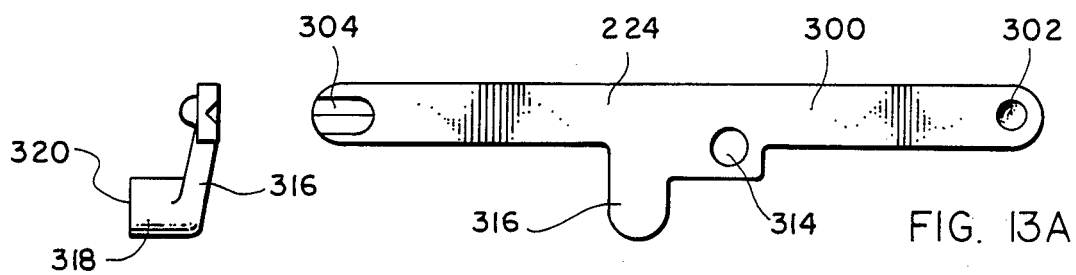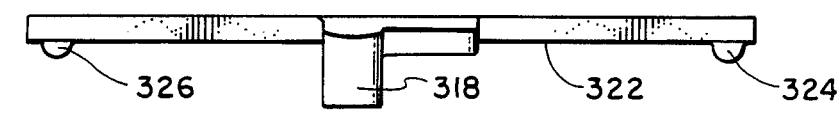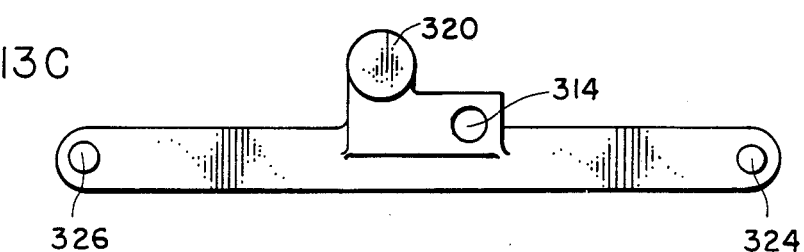

TRANSDUCER SUPPORT APPARATUS

FIELD OF THE INVENTION

This invention relates to apparatus for magnetic recording on flexible rotating discs, and more particularly to an apparatus for supporting electromagnetic transducers on opposite sides of the flexible rotating magnetic media (floppy disc) for the purpose of double sided reading/ recording thereon.

DESCRIPTION OF PRIOR ART

Subsequent to early work on disc and drum files for data processing systems, the use of contact recording was generally abandoned as air bearing magnetic heads and associated support mechanisms were developed for "flying" a transducer at a small spacing from a magnetic recording surface, to permit intimate interaction between the transducer and the magnetic surface. Contact recording continued to be used in magnetic tape systems, for which multichannel heads were typically employed. However, contact recording for disc media was revived with the introduction of the so-called "floppy" disc system, in which a thin pliant disc element contained within a cover jacket was used in combination with low cost accessing, transducing and control systems.

Floppy disc systems have subsequently found widespread application not only in the program storage and entry applications for which they were originally intended, but also in a wide variety of data entry, storage, and control applications. In the original single sided systems, the transducer structure generally comprises a single channel head with associated erase heads, mounted in a transducer having a contact surface that is a segment of a spheroid or at least curved, the transducer itself being mounted in a carriage element that is accessed to different circumferential tracks on the floppy disc. On the opposite side of the disc from the transducer, and also in contact with the disc, is an elastic, felt pad mounted adjacent the end of a spring-loaded arm, so as to exert pressure against the pliant disc and elastically deform a localized area of the disc into intimate conformance with the spherical transducer surface when data transfer operations are to take place.

More recently, the floppy disc industry has started to use both sides of the floppy disc for data storage operations, the purpose primarily being to increase capacity.

Thus a single accessing mechanism continues to be employed, and the transducers on opposite sides of the media are in a generally opposed relation, with only a slight offset in the head gaps to avoid flux interaction. Because it was thought necessary to account for deviations in the position of the flexible disc from its nominal position, recording heads and mounts were first used that were essentially derived from the flying head technology. Specifically, a pair of identical slider heads were used, each gimbal mounted on the opposite sides of the media, and mechanically urged together.

Gimbal mounts for this purpose may take many forms: Free moving gimbals such as the ball and socket of U.S. Pat. No. 3,170,149 Koskie et al, and the ring gimbal of U.S. Pat. No. 3,051,954 Osterlund; or hybrid gimbals such as U.S. Pat. No. 3,702,461 Cantwell; or elastic diaphragm and load point gimbals such as U.S. Pat. No. 3,310,792 Groom et al and U.S. Pat. No. 3,931,641 Watrous.

The concept was that as the flexible disc deviates from its norminal plane, both of the heads tend to follow the actual position of the disc passing between them and permit contact recording without excessive wear or signal degradation.

If these gimbals are of the freely pivoting type such as Koskie or Osterlund, they have no preferred orientation, and the only factor determining the disc plane is the stiffness of the disc itself. In the complex frictional interaction of the moving disc and the two gimbaled heads, stable operation is difficult to obtain, and temporarily unstable operation after disc start up or carriage motion may require substantial delays before data can be reliably transferred.

If the gimbals are of the hybrid or diaphragm type such as Cantwell, Groom, or Watrous, then in addition to the disc stiffness, the stiffness of the diaphragms assists in establishing a working plane for the disc, however, both gimbal diaphragms must be carefully fabricated and held within narrow angular limits to permit the combination of all elements to operate satisfactorily, and even so, the dynamic instability problems described above still exist.

These dual gimbals are relatively complex, and must be precisely manufactured and are therefore costly. Furthermore, since the roll centers of most designs are not located at the disc surface, offsets from the track centerline occur during the gimballing action, reducing the positional accuracy of the system, which in turn limits the track density which can be achieved.

More recently, an improved apparatus was utilized as described in U.S. Pat. No. 4,151,573 Tandon et al. In this apparatus, one of the two transducers is fixedly mounted in the carriage, and therefore defines a plane against which the magnetic disc is biased by pressure from the second transducer which being gimbal mounted in the usual way, assumes itself the plane of the disc. This apparatus eliminates the instability inherent in the earlier approach. Moreover, it eliminates the expense of one of the gimbal mounts. Since it always operates in a fixed geometric relationship, it also eliminates the track offset problems of the earlier approach.

There are however many problems and limitations arising from the use of this combination of a fixed and a gimballed transducer. The gimballed transducer retains all of the complexity and expense inherent in such a mechanism. Current designs utilize a diaphragm and load point gimbal. These designs require that the diaphragm be carefully adjusted to align the relaxed plane of the gimballed head with the operating plane of the disc within narrow limits to avoid excessive inequality of loading over the transducer surface which leads to unstable elastic and frictional interplay between the media, the head, and the gimbal.

Furthermore, the complexity of the gimbal results in numerous additive manufacturing tolerances which must be eliminated by incorporating an adjustable assembly operation performed under a microscope, further adding to the cost of manufacture.

Typically, the transducer supporting mechanism is clamped into a jig which contacts selected reference points. Cement is then applied to the transducer socket, and the transducer is applied and moved about while the cement is still liquid, while observing the working face of the transducer through a microscope, and aligning the image of the magnetic gap with cross hairs built into the microscope.

Since the two transducers will ultimately be mounted face to face, thereby blocking optical access to the working faces, this optical alignment procedure must be performed on each of the two transducers prior to final assembly.

After the two transducers have each been optically aligned relative to its selected reference points, they are both placed in a third jig which positions the two sets of reference points relative to each other while the complete assembly is clamped and glued together. The resulting inaccuracy of alignment between the upper and lower transducers is the sum of the inaccuracies of the three alignment jigs, the two optical alignment procedures, and any movement of the transducers during the hardening of the cement. A major weakness of this design is the resulting magnitude of misalignment between upper and lower transducers, where a goal of less than one hundred microinches is normally desired.

Combining the two transducers into a complex, prealigned, permanently cemented assembly, forces complete replacement of this costly assembly when a single flaw develops in either transducer during initial factory assembly, or subsequent operation in the field, and this lack of selective, localized repair and realignment capability is a substantial weakness in the design.

The structure which connects the two transducers together in a 5 ¼ inch minifloppy drive must be on the order of four inches in length in order to reach in on each side of the disc, the required two inches from the edge. At the same time, it must align the two transducers within about one hundred microinches radially to permit both heads to simultaneously align closely with the established nominal track positions. This four inches of support structure is composed of a number of pieces manufactured by different processes from different materials. In prior art, the upper transducer arm is assembled from a combination of thin metallic flexure elements, and plastic parts, while the lower transducer arm is completely of plastic. As a result, during operation, the upper and lower transducers become misaligned due to unequal thermal expansion of the two arms both from changes in ambient temperature and from heat generated within the drive.

In a like manner, the upper and lower transducers become misaligned due to unequal hygroscopic expansion of the upper and lower arms as the ambient humidity changes.

Both of these temporary, reversible inaccuracies are weaknesses in existing designs.

Long term, irreversible dimensional changes occur in the transducer support members due to crystallization, stress relief, shrinkage, and creep. Due to the differences in construction between the upper and lower transducer support arms, these irreversible dimensional changes will be unequal and will result in a gradual increase in misalignment between the two transducers. It is a weakness in the prior art that no provision is made for realigning these transducers and thus repairing the drive at slight cost, rather than replacing the entire expensive dual transducer assembly.

It is the general practice in the prior art to mount the upper transducer on a flexurally hinged arm, whose entire mass lies on one side of the flexure. The weight of the arm is impressed by the transducer, against the disc when the drive is mounted with the spindle pointed vertically, however, when the drive is mounted with the spindle pointed horizontally, this weight is not impressed against the disc. Therefore, the biasing spring must be strong enough to properly load the transducer against the disc without relying on the gravitational load, but for a horizontally mounted drive the gravitational load must be endured as an unwanted, excessive load. Similarly, since this upper transducer arm is in no way counterbalanced in prior art, the biasing spring must be sufficiently strong to resist separation of the transducer from the disc due to vibration or shock, a requirement that greatly increases the required force of the biasing spring. In most designs such as Tandon et al, the biasing spring originates at a different point than the flexure spring. Consequently, when the upper transducer arm moves on its flexure, relative sliding movement occurs between the upper arm member and the biasing spring. The friction from this relative movement adds a substantial load to the nominal biasing spring load during upward movements of the transducer arm and subtracts a substantial load from the nominal biasing spring load during downward movements of the transducer arm. As a consequence the biasing spring must be made even stronger than otherwise required in order to deliver the required force even when this downward differential force is subtracted.

As a result of these unbalanced gravitational loads, unbalanced shock and vibration loads, and differential spring friction, transducers in the prior art are typically loaded against data discs at many times the pressures that would be required if the heads were fully balanced, and frictional forces minimized.

As a result of this excess friction at the transducers, standing waves are generated in the flexible media, and to flatten these standing waves, the disc jacket must be clamped adjacent to the head contact area. This clamping increases wear on the magnetic media. It also generates further friction as well as heating and thermal expansion of the flexible media. The torque from friction at the transducers and friction from disc jacket clamping must be exceeded by torque from friction at the clamping hub. The greater this torque requirement at the hub, the greater must be the axial clamping force. In prior art, this axial force is applied to ball bearings above and below the data disc and the frictional torque load from these ball bearings is proportional to the axial load they support and adds further to the total torque load that must be overcome by the spindle motor. The heat from a high torque spindle motor and from its speed control electronics distorts the drive and the data disc due to thermal expansion. High frequency variations in spindle rotation velocity, known as flutter, limit data density, and are proportional to the ratio of spindle friction to spindle inertia. Thus, excess frictional torque increases the amplitude of flutter in the drive. It is a weakness in the prior art that drive torque and flutter are excessive because of unbalanced transducers and excessive friction in transducer biasing springs.

In addition, in order to establish four or more electrical connections between the gimballed transducer and its nearest support, without unacceptably biasing or stiffening the gimbal, it is the practice to make this connection with a small, flexible printed circuit assembly. The cost of this extra element, and the cost of fabricating junctions between it and other circuit elements both on the gimballed transducer and on its supporting arm further add to the cost of manufacture.

A further limitation to the apparatus of Tandon et al is the inability of the fixed head to move normal to the disc surface. As a consequence the transducer surface must be manufactured with radiused or beveled edges far in excess of those required for satisfactory operation on the disc surface. These extra radii or bevels are required to permit the insertion and removal of the disc protecting jacket which slides across the fixed head. These extra features further add to the manufacturing cost.

SUMMARY OF THE INVENTON

It is an object of the invention, to provide a transducer support which provides a single fixed geometry during data transfer operations.

It is a further object, to simplify the design so that the parts can be manufactured inexpensively by simple molding and stamping operations.

It is a further object, to counterbalance the movable transducer which is spring biased against the recording media, and by so doing eliminate the effects of shock, vibration, and gravitational variations caused by mounting the drive in various orientations.

It is a further object, to mount the movable, spring biased, transducer on a means having a very low frictional resistance to movement, and very low hysterisis in the biasing spring system.

It is a further object, to bias the movable transducer against the recording media by a force less than five grams.

It is a further object, by means of this low biasing force, to reduce wear on the recording media.

It is a further object, by means of this low biasing force, to reduce standing wave formation in the recording medium.

It is a further object, by means of this low biasing force, to reduce heating and thermal expansion of the recording medium, and thereby increase the accuracy of the drive.

It is a further object, by means of this low biasing force, to reduce the torque requirement and flutter amplitude of the spindle drive motor, and thereby decrease power input to the drive and heat generated in the drive, and allow increased data densities.

It is a further object, to provide means for the movable, spring biased, transducer to be moved substantially, vertically away from the disc surface a sufficient distance to allow removal of the disc and its protective jacket without interference with the transducer.

It is a further object, to provide means for the normally fixed transducer, to be moved substantially vertically and against a strong spring bias, away from its normal positioning means, and away from the disc surface a sufficient distance to allow removal of the disc and its protective jacket without interference with the transducer. By providing this clearance mode in both transducer supports, the transducers themselves can be simplified, with no need for ramps and bevels to protect the transducer from the disc jacket.

It is a further object, to provide a mechanism that does not require assembly jigs, or the use of microscopes in its manufacture.

It is a further object, for greater accuracy, to use magnetic interaction between precise alignment data discs and electromagnetic transducers for the purpose of properly positioning those transducers rather than visual estimates of where magnetic fields might later be generated.

It is a further object, for greater accuracy, to adjust the relative alignment of the upper and lower transducers after assembly of the structure is complete, and thereby allowing construction from loosely toleranced parts, but nevertheless achieving the highest possible accuracy in the finished assembly by adjusting the structure after assembly and while reading precisely written magnetic data.

It is a further object, to provide an adjustment means by which the transducer support structure can be realigned in the factory or in the field, to correct the misalignment caused by long term dimensional changes in the parts due to crystallization, stress relief, shrinkage, and creep.

It is a further object, to permit both in the factory and in the field, replacement or repair of either individual transducer, or any other part in the structure, and after realignment return the assembly to service without having scrapped any parts other than the faulty ones.

It is a further object, that the materials and structures of the transducer support apparatus are such that the two transducers remain in relative alignment during temporary, reversible, dimensional changes caused by thermal expansion from heat generated within the drive, or by changes in ambient temperature.

It is a further object, that the materials and structures of the transducer support apparatus are such that the two transducers remain in relative alignment during temporary, reversible, dimensional changes caused by changes in ambient humidity.

It is a further object, to provide a structure compatible with existing magnetic transducer assemblies.

It is a further object, to provide an apparatus which is compatible with existing data disc formats.

The foregoing objects and advantages are realized in accordance with the present invention by an apparatus which supports and aligns a pair of magnetic transducers in appropriate operative relationship on opposite sides of a rotatable magnetic disc for recording and reading data which includes first and second transducer support arms carried by a carriage means. Biasing means is provided to bias the first and second arms toward each other and toward the carriage means. There are also provided two adjusting means carried by the carriage means to orthoganally adjust one of the support arms relative to the other to align the transducers carried by the support arms to a predetermined standard relationship.

In accordance with another aspect of the present invention, the support arms, the carriage means and the adjusting means are constructed of a material which has substantially the same thermal and hygroscopic coefficients of expansion and contraction as does the magnetic disc, preferably these parts are molded from a plastic material, preferably fiberglass filled polycarbonate plastic.

In accordance with the method of the present invention, a magnetic disc prerecorded with precise magnetic transitions is positioned between the magnetic transducers and rotated. The disc is then positioned accurately relative to the fixed transducer. Then the adjustable transducer support arm is adjusted orthoganally to achieve the predetermined standardized relationship, as indicated by signals being read from the prerecorded magnetic disc by the two transducers.

BRIEF DESCRIPTION OF THE DRAWINGS

FIG. 5 is a cross sectional view taken about the lines 5—5 of FIG. 4; and

FIG. 6 is a view taken about the lines 6—6 of FIG. 5 illustrating the pocket for receiving a ball to provide a pivot.

FIG. 12, a, b, c and d is the top, side bottom and end views of one of the adjusting devices as shown in FIG. 7; and FIG. 13a, b, c and d is a top, side, bottom and end view of another of the adjusting devices as illustrated in FIG. 7.

DETAILED DESCRIPTION

The supporting structure constructed in accordance with the present invention provides a simple one axis pivotal mounting for a magnetic transducer for use with a rotating disc constructed of pliant or flexible magnetic recording medium. The various members comprising the apparatus are constructed of molded plastic and include a simple, positive mounting arrangement between the transducer mounting assembly and the supporting arm therefor. Through utilization of a simple transducer mounting arrangement as is disclosed in the present invention there is provided extremely accurate recording and reading of data upon the rotating magnetic disc with a relatively simple structure which can be easily assembled and disassembled and which creates minimal wear on the surface of the disc.

Figure 1:
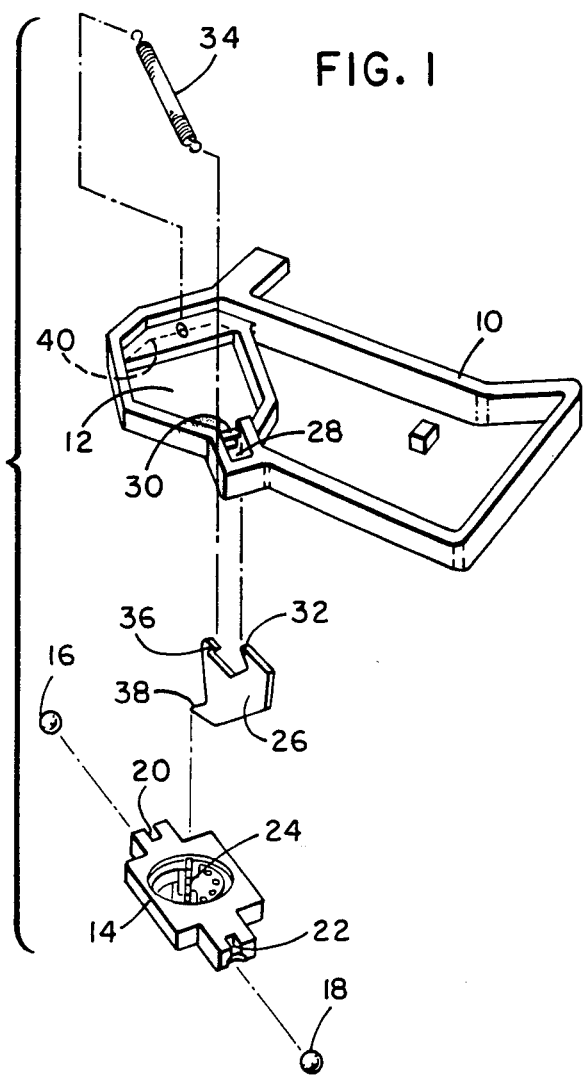
FIG. 1 is a schematic view, in exploded form illustrating the upper support arm which receives the transducer mounting assembly constructed in accordance with the present invention.

FIG. 1 generally illustrates in schematic representation only, the support arm within which there is received the magnetic transducer held within its mounting assembly. The support arm includes a body member 10 which is molded from plastic material, preferably a glass-filled polycarbonate. The body 10 defines an opening 12 within which there is received a transducer mount 14. The transducer mount 14 is pivotally supported within the opening 12 by a curved surface preferably defined by a pair of balls 16 and 18 which are received within pockets 20 and 22 which are molded as an integral part of the mount 14. The transducer head 24 is positioned which are molded into the mount 14. The transducer head 24 is positioned within the mount 14 by being properly inserted into an opening defined therein, after which the head is secured in place by adhesive materials or the like.

The mount 14 with the balls 16 and 18 are appropriately placed within the opening 12 after which a keeper 26 is positioned within a slot 28 extending from the opening 12 in the arm 10. A pin 30, which may be integrally molded with the arm 10, operates to retain the keeper on the arm 10 by way of the extension 32 thereof. A spring 34 is affixed to the hook 36 on the keeper 26 to thereby retain the keeper 26 in place and to apply a force against the ball 18 by contacting it with the surface 38 on the keeper and thereby to bias the balls 18 and 16 along with the mount 14 toward the edge 40 of the opening 12. In this manner, the transducer mount with the head 24 positioned therein is firmly seated at a predetermined point within the support arm 10 and is permitted to pivot about an axis through the balls 16 and 18 so as to be rotatable only about that axis.

Figure 2:
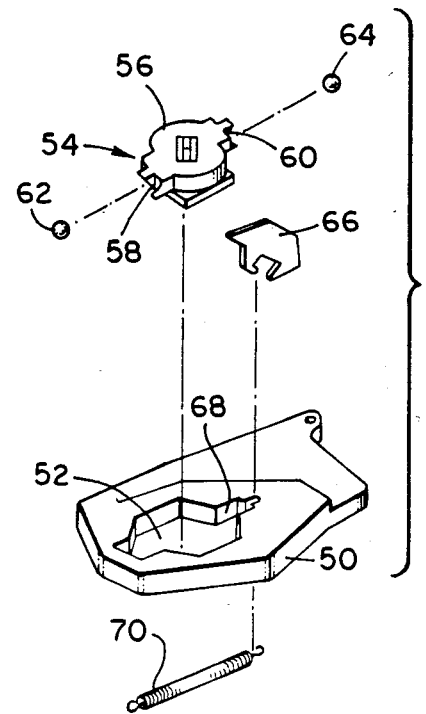
FIG. 2 is a view similar to FIG. 1 but showing the lower supporting arm.

FIG. 2 illustrates a similar structure to that of FIG. 1 but which is designed to receive the opposed magnetic transducer, in this instance the lower transducer. As is shown in FIG. 2 a support member or arm 50 defines an opening 52 therein for receiving the lower transducer mount 54 which has the head 56 received therein. As with the mount 14, the mount 54 defines a pair of sockets 58 and 60 within which are positioned balls 62 and 64, respectively. The balls are received within appropriate opposing sockets defined by the arm 50 to permit pivoting of the mount 54 about the axis drawn through the balls 62 and 64. Again a keeper 66 fits within a slot 68 and is retained therein by the spring 70 in precisely the same manner as that described with respect to the keeper 26 shown in FIG. 1.

Figure 3:
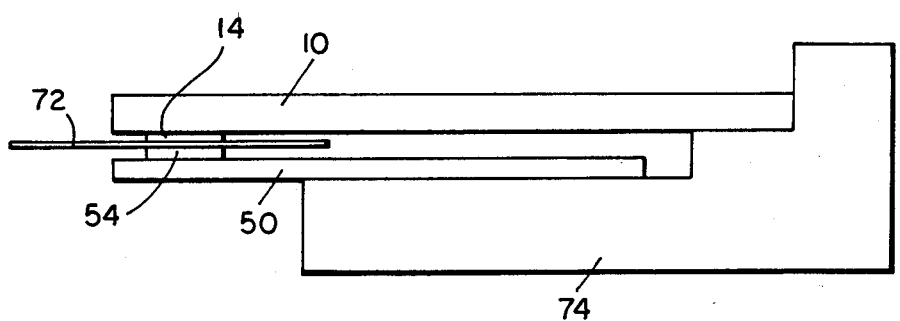
FIG. 3 is a schematic representation showing the structures of FIGS. 1 and 2 mounted upon an appropriate positioning carriage shown in block diagram form.

After assembly, the structures shown in FIGS. 1 and 2 are disposed on opposite sides of a pliant rotating magnetic recording/reading medium 72 (a floppy disc) as shown in FIG. 3. As is noted, the magnetic transducers 14 and 54 are on opposite sides of the media 72 with their axes of rotation angularly disposed with respect to each other (FIGS. 1 and 2). As will be recognized by those skilled in the art, the structure of FIG. 3 is schematic only in that detailed structures for positioning, driving the media and accomplishing the various recording and reading techniques are not illustrated. The positioning apparatus for the transducers 14 and 54 is shown in block form at 74 only. Those skilled in the art will recognize that the positioning apparatus may take various forms.

Figure 4:
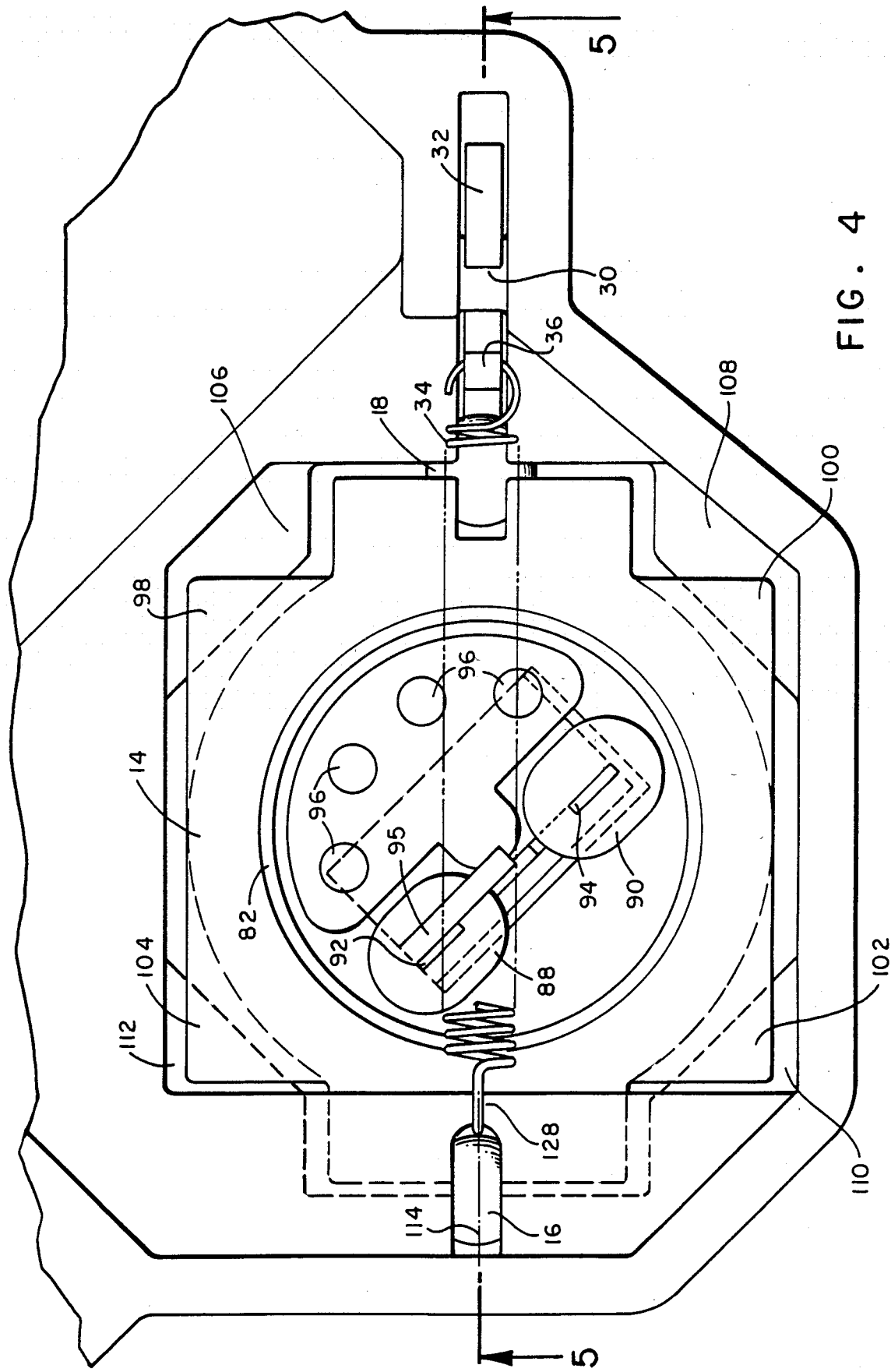
FIG. 4 is a top plan view of a portion of the arm illustrated in FIG. 1 showing the structure in its assembled form.

Referring now more particularly to FIGS. 4 and 5, there is illustrated the cooperative relationship between the transducer mount and the support arm. It will be recognized by those skilled in the art that FIG. 4 is a top plan view of the assembled apparatus as illustrated in FIG. 1. The apparatus shown in FIG. 2 is similar in structure as will be thoroughly understood by a review of the structures shown in FIGS. 4 and 5.

As is shown, the mount 14 defines a recess 80 which receives the head 24. After the head 24 is properly positioned within the recess 80, it is secured therein by means of adhesive or the like as is well known to those skilled in the art. Thereafter, a high permeability magnetic shield ring of Mu metal or the like 82 is installed in the recess 84 provided in the mount 14. Coils 86, 88 and 90 are disposed upon the posts 92 and 94, respectively and thereafter the butt bar 95 constructed of a ferrite material is cemented into place completing the mount assembly. These assemblies are identical for the upper and lower transducers. The magnetic coil wires from the coils 86, 88 and 90 are wrapped around the posts 96 formed as part of the mount 14.

The mount 14 additionally includes flanges 98, 100, 102 and 104. These flanges cooperate with additional flanges 106, 108, 110 and 112, respectively, to limit the extent of pivotal rotation about the axis 114 of the mount 14 which is defined by the balls 16 and 18. It will be noted that the axis 114 passes through the body of the transducer means and its mount and is displaced from the center thereof toward the transducer.

The pockets for receiving the balls 16 and 18 to pivotally support the body 14 are formed by providing depressions at opposite ends of the mount 14 which are positioned in opposed relationship with similar pockets formed in the opposite sides of the opening 12 provided in the arm 10. Each of the depressions is formed in such a way that there is provided a pocket or recess defined by three flat surfaces. When the ball is placed into contact with these three flat surfaces, three points of contact are provided which are equidistant about the axis 114 and displaced approximately 45 degrees therefrom. The construction details are more clearly illustrated in FIGS. 1, 5 and 6. As is shown, the recess or pocket 22 is formed by providing flat surfaces 120, 122 and 124. The surfaces 120 and 122 extend inwardly from the wall 126 forming the outer surface of the mount 14. The surface 124 is effectively formed by a ramp-like portion extending inwardly into the mount body 14. It will of course be understood that the ramp-like portion 124 is an integral molded part of the body 14. The configuration of the pockets such as described has been adopted as most feasible for molding with relative ease. Obviously, other types of formations could be utilized to accomplish the same function and purpose.

As above noted each of the recesses is formed in substantially the same way, with the exception, however, of the recess in the arm 10 into which the ball 18 fits. The recess formed therein is provided without the ramp-like structure at the lower portion thereof. Furthermore, the opening 28 is also provided at this point to receive the keeper 26 as above described. As is noted, when the mount 14 is positioned as shown in FIG. 5, the spring 34 fits around the hook 36 of the keeper 26 and in turn is anchored at the opposite side around a bar 128 formed as part of the arm 10. As a result of the slight offset from the center of the rod 30 to the hook 36, a rotational moment is applied to the keeper 26 to cause it to tend to move in the direction shown by the arrow 130. This movement urges the surface 38 of the keeper 26 against the ball 18 thereby completing the pocket and at the same time applying a force along the axis 114 in the direction shown by the arrow 132 to thereby properly position the mount 14 with respect to the arm 10 and securely position it in the correct position.

To assemble the mount 14 within the arm 10 a stainless steel ball is placed within the recess 134 (FIG. 5), after which the recess 20 is placed in contact with the ball 16 and the transducer assembly or mount 14 is hinged downward about the center of the ball 16 until the flanges 98 and 100 strike the flanges 106 and 108, respectively. In this position the ball 18 can be installed in the recess 22. Thereafter the transducer mount 14 can be pivoted upward around the center of the ball 18 until it strikes the surfaces at the upper portion of the recess formed in the arm 10. At this point the keeper 26 is placed in the slot 28 from the bottom of the arm 10 (as shown in FIG. 5) with the arm 32 placed in position over the bar 30. In this manner the retaining recess is completed by the surface 38 on the keeper 26 to retain the ball 18 in position. The spring 34 is then positioned as shown in FIGS. 5 and 6 to thereby bias the keeper 26 as above described.

After appropriate assembly of the transducers about their respective pivot points into their respective transducer support arms as above described the arms are assembled along with appropriate adjusting mechanisms into a carriage body to provide a carriage assembly. The carriage assembly is then placed within the housing along with appropriate positioning apparatus not shown or described herein.

Figure 7:
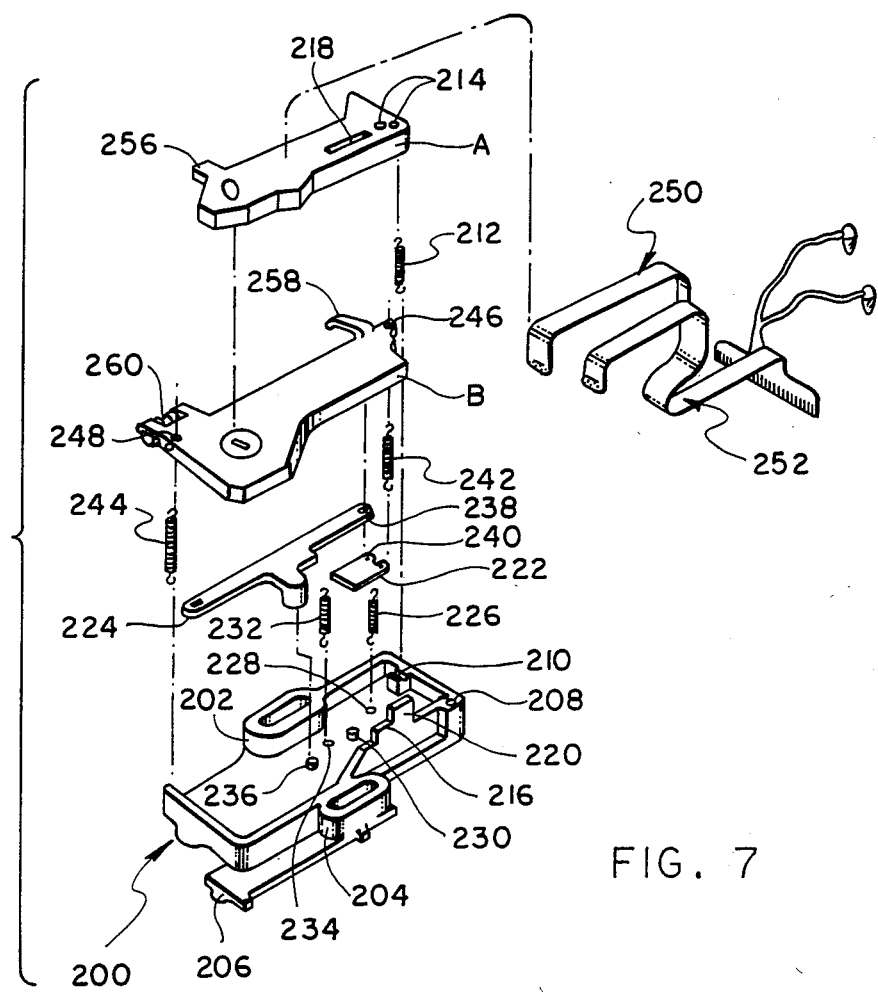
FIG. 7 is an exploded view which is a schematic representation of the transducer support arms along with adjusting mechanism as they will be received and supported within a carriage mechanism.

The carriage assembly is illustrated in FIG. 7 in schematic representation and in a simplified exploded view. As is therein illustrated the carriage body 200 is a molded plastic member constructed of fiberglass filled polycarbonate plastic. The body 200 defines a pair of ball races 202 and 204 which are used to receive a plurality of balls which are placed in contact with an appropriate housing member to permit positioning of the carriage after assembly and upon application of appropriate positioning force to an input drive arm 206. The positioning mechanism, the balls and the housing are not illustrated herein. The carriage body 200 defines a conical depression or socket 208 and a "V" shaped socket 210 which receives a pair of hemispherical protrusions (not shown) extending from the upper transducer support arm A.

A spring 212 is coupled between the upper transducer support arm A by being hooked through the openings 214 and through an appropriate opening provided in the carriage body 200 (not shown) thereby to bias the upper transducer support arm A toward the carriage body. The carriage body defines a shoulder 216 against which the upper transducer support arm A rests so as to be fixed in its relationship with respect to the carriage body 200. The upper transducer support arm defines an opening 218 therethrough which receives a fin-like projection 220 extending from the carriage body 200. The fin 220 extending through the opening 218 functions to mitigate movements imparted to the assembly by external shock which may be inadvertently applied thereto during shipment, installation and the like. By such mitigation, damage to the unit is substantially eliminated.

A linear adjusting member 222 and a transverse adjusting member 224 are sandwiched between the lower transducer support arm B and the carriage body 200 and are positioned to permit linear and transverse adjustment of the lower transducer support arm B to properly align the magnetic transducer carried thereby with respect to the magnetic transducer carried by the upper transducer support arm A so as to properly position each of the magnetic transducers with respect to the magnetic disc 72 rotating therebetween.

A spring 226 biases the linear adjusting member 222 toward the carriage body 200 and is positioned between an opening 228 provided therefor and an opening in the adjuster 222. The adjuster 222 rests against an adjusting member 230 which is carried by the carriage body 200 and may be extended in and out of the carriage body such as by being threadably received therein. The movement of the adjuster 230 causes angular movement of the linear adjusting member 222 about an axis defined by a pair of pivot points as will be more fully defined hereinafter.

The transverse adjusting member 224 is biased by a spring 232 toward the carriage body 200. The spring 232 is disposed within an opening 234 provided in the carriage body and an opening in the transverse adjuster 224. The transverse adjuster 224 rests against an adjusting member 236 which functions similarly to the member 230 but causes the transverse adjuster 224 to move about a pair of pivot points disposed at opposite ends thereof as will be more fully described hereinbelow. It will be noted that the end 238 of the transverse adjuster 224 rests upon and is pivotally associated with a conical socket 240 provided in the radial adjuster member. In addition thereto the lower transducer support arm B is in direct engagement with the transverse adjuster 224. As a result of this direct engagement, adjustment of the threaded member 230 moves transducer arm B along its longitudinal axis (linearly) thereby to position the magnetic transducer radially with respect to the magnetic disc whereas movement of the adjuster member 236 moves the transducer arm B transversely of its longitudinal axis thereby angularly adjusting the magnetic transducer carried by it with respect to the magnetic disc. In reality, the magnetic transducer carried by the support arm B through these adjustments is being adjusted with respect to the magnetic transducer carried by the upper support arm A, and thus permit by adjustment of the carriage as a whole by other means the appropriate radial and transverse adjustment with regard to the rotating magnetic disc to provide accurate recording and reading of data upon the magnetic disc by both transducers.

The springs 242 and 244 bias the support arm B toward the carriage body 200 by being connected between appropriate openings provided in the support arm B shown at 246 and 248, respectively, and in the body 200 (not shown).

Appropriate flexible circuits as shown at 250 and 252 are connected to the upper and lower transducer support arms A and B and provide interconnections for transmission of the data to and from the magnetic transducers through the remainder of the circuit as illustrated as will be understood by those skilled in the art.

Through the arrangement as described with respect to FIG. 7 it will be recognized by those skilled in the art that the lower transducer support arm B is adjustable relative to the carriage body 200 while the upper transducer support arm is fixed with respect to the carriage body 200.

As will become more fully recognized and described in detail hereinafter, the arms A and B are movable away from each other to permit the insertion of a magnetic disc therebetween without concern for damage to the disc or to the magnetic transducers carried by the arms. Such movement is provided by the extensions 256 and 258 from the arms A and B. Upon being engaged by an appropriate force imparting mechanism (not shown) which is engageable when a disc is to be inserted between the magnetic transducers, the arms pivot (as will be more fully described hereinafter) to cause them to separate or move away from each other.

As will also be described more fully hereinafter, a counterweight 260 is carried by the support arm B to control the amount of force which is exerted by the magnetic slider carried by the arm B against the magnetic disc. The amount of force preferably is limited to about 5 grams irrespective of the mounting attitude of the carriage assembly in operation.

Figure 9:
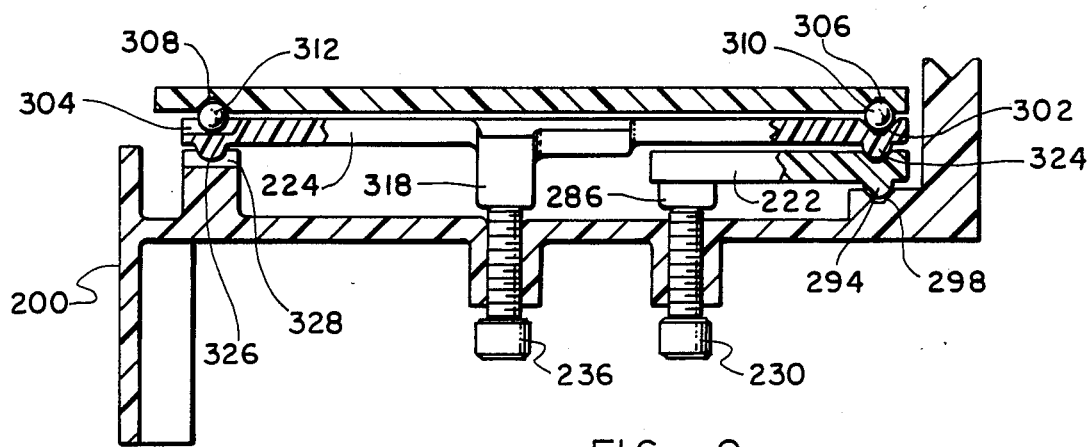
FIG. 9 is a cross sectional view taken about the line 9—9 of FIG. 8.
Figure 8:
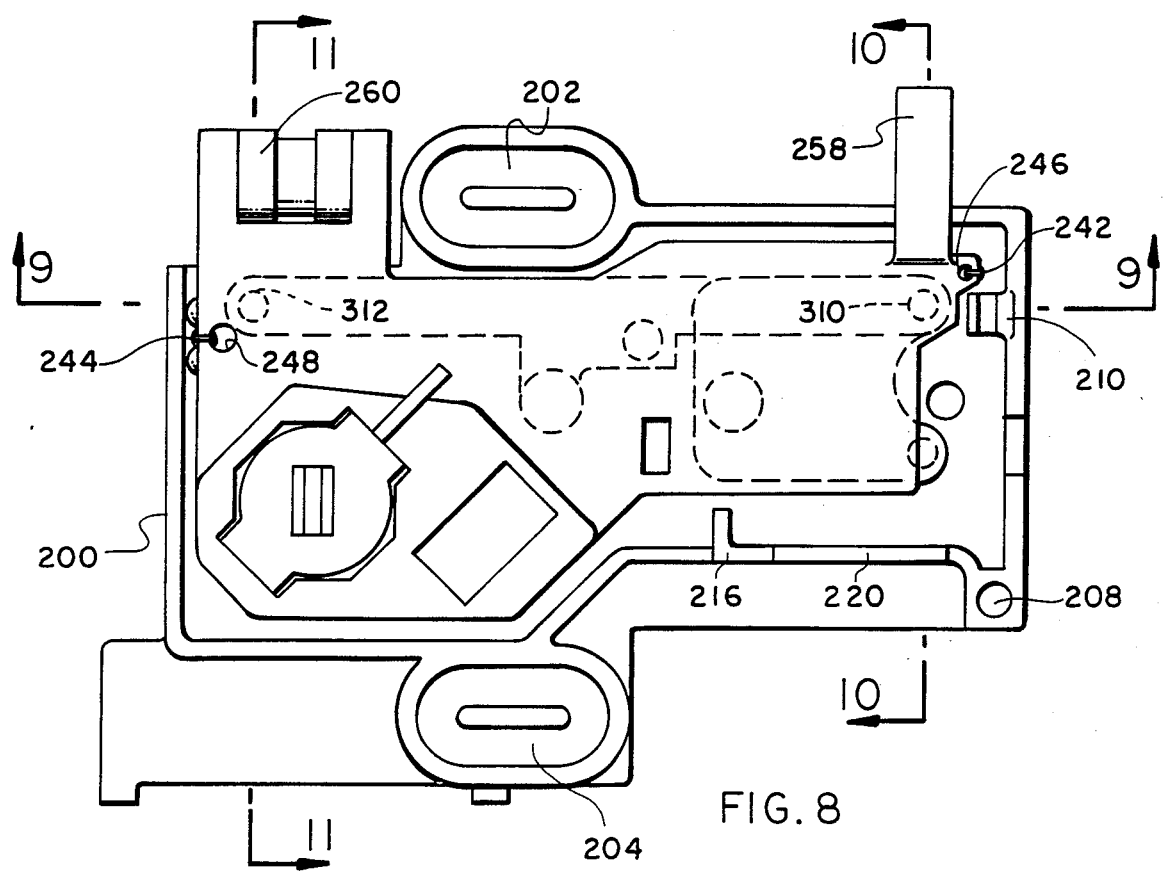
FIG. 8 is a top plan view of the structure illustrated in FIG. 7 in assembled format but with the upper transducer support removed.
Figure 10:
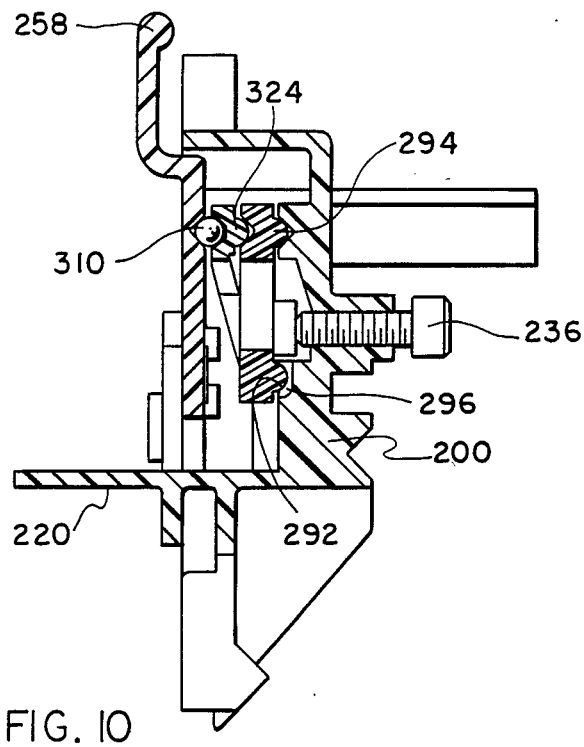
FIG. 10 is a cross sectional view taken about the lines 10—10 of FIG. 8.
Figure 11:
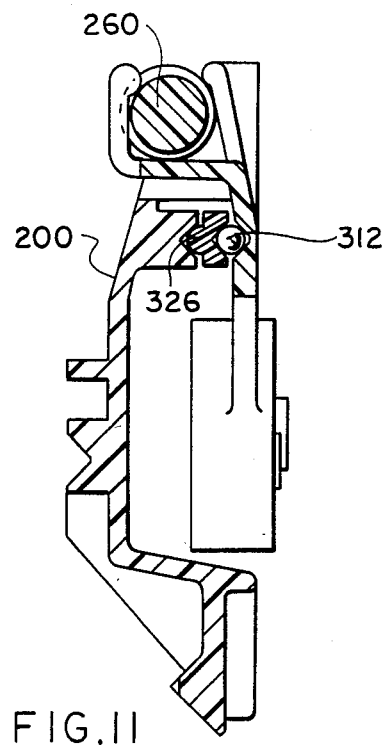
FIG. 11 is a cross sectional view taken about the lines 11—11 of FIG. 8.

As can be seen more clearly in FIG. 9, the linear and transverse adjuster members 222 and 224, respectively, are sandwiched between the lower transducer support arm B and the carriage body 200. The particular relationships and configurations of the radial and transverse adjuster members 222 and 224 may be better understood from a detailed description and illustration thereof which will now be given with reference to FIGS. 12 and 13.

As is shown in FIG. 12 the linear adjuster member is a plate-like structure 222 molded from fiberglass filled polycarbonate plastic. The plate 222 defines a pair of openings 280 and 282 therein which receive the spring 226. A conical depression 240 is provided in the upper surface 284 of the plate 222. That conical depression receives a hemispherical protrusion extending from the transverse adjuster 224 as will be more fully described below.

A protrusion 286 is provided extending from the lower surface 288 of the plate 222. The protrusion 286 defines a flat surface 290 which engages the end of the adjusting screw 230.

Extending from the bottom surface 288 of the plate 222 are a pair of spherical protrusions 292 and 294. The protrusion 292 is received within a V-shaped socket 296 defined by the carriage body 200, while the spherical protrusion 294 is received within the conical socket 298 also defined by the carriage body 200.

By reference to FIG. 13 the transverse adjuster 224 is constructed of a finger-like molded fiberglass-filled polycarbonate plastic. The upper surface 300 of the finger defines a conical socket 302 and a V-shaped slot or socket 304.

By reference to FIG. 9 it will be noted that the lower transducer support arm defines a pair of conical sockets 306 and 308 into which a pair of stainless steel spheres or balls 310 and 312 have been cemented. The balls 310 and 312 are received within the sockets 302 and 304 provided by the upper surface of the transverse adjuster 224.

An opening 314 is provided through the adjuster 224 which receives one end of the spring 232. The adjuster 224 includes an offset arm 316 which terminates in a cylinder 318 defining a surface 320 which engages the end of the adjusting screw 236.

Extending from the lower surface 322 of the transverse adjuster 224 are a pair of spherical projections 324 and 326. The spherical projection 324 seats within the conical socket 240 on the radial adjuster 222. The spherical projection 326 is seated within a V-shaped socket formed on the carriage body 200.

Referring now again to FIGS. 8 through 11 it can be seen that the lower transducer support B is installed with the ball 310 engaging the conical socket 302 and the ball 312 engaging the V-shaped socket 304. The springs 244 and 246 engage the carriage body 200 and thereby bias the lower transducer support against these points of support. While the springs 244 and 246 are designed to have matching characteristics the spring 246 is offset a slightly greater distance from an axis drawn through the center of the balls 310 and 312 than is the spring 244. As a result, the spring 246 exerts a slightly greater moment and the combined action of the two springs serves not only to hold the support arm B against its points of support but also to rotationally bias it so as to cause the lower magnetic transducer to move into contact with the rotating disc surface.

As was above described with respect to FIG. 7, the upper transducer support arm A is installed with one spherical projection engaging the conical socket 208 provided in the carriage body 200 and with another spherical projection extending therefrom engaging the substantially V-shaped socket 210. As further indicated, the lower surface of the arm will abut the shoulder 216 on the body 200. The spring 212 biases the upper transducer support arm A very heavily against these three points of support. Thereby, the upper transducer support arm A is essentially fixed in its position, except in those rare cases when an accidental extreme shock is imparted to the assembly which, as above indicated, is mitigated by the fin 220 extending through the opening 218.

Referring to FIGS. 7–10 it will be seen that rotating adjustment screw 230 will cause linear adjuster 222 to rock on spherical projections 292 and 294, thereby causing a movement of conical socket 240 toward or away from the center of the magnetic disc rotation. As a result, transverse adjuster 224 and lower transducer support B will follow the movement of conical socket 240 and by adjusting screw 230 while reading precisely recorded data from the two transducers the correct radial alignment between the two can be established.

Similarly, rotating adjustment screw 236 will cause transverse adjuster 224 to rock on spherical projections 324 and 326 and thereby cause a movement of conical socket 302 and "V" socket 304 in the tangential or transverse direction. As a result the lower transducer support B will be repositioned in the tangential or transverse direction. By adjusting screw 236 while reading precisely recorded data from the two transducers the correct tangential alignment between the two can be established.

The adjusting screws 230 and 236 and the threads formed to relieve them are designed to be partially interfering. In this manner after adjustment the screws retain their position.

Should either transducer, or any portion of the mechanism, need to be replaced or repaired, the entire assembly can easily be restored to proper alignment by the same means.

Should the mechanism become misaligned in the long term by dimensional changes from crystalization, stress relief, shrinkage, and creep it can easily be restored to proper alignment by the same means.

Since the two transducer supports A and B, the two transducer adjusters 222 and 224, and the carriage body 200 are all manufactured of the same material and by the same process, thermal and hygroscopic expansion of all five parts will be approximately equal, thus while the structure as a whole will swell and shrink in size, the relative alignment of the two transducers will remain essentially unchanged.

By lifting upward (as viewed in FIG. 7) on extension 256 and 258 both transducer support arms A and B will be moved away from the disc surface permitting unobstructed loading and unloading of the data disc.

Flanges 98, 100, 102 and 104 by abutting flanges 106, 108, 110 and 112 on the upper transducer and support therefor and similar features on the lower transducer and support, will limit the magnitude of rotation about pivot balls 123 and 124 and similar pivot balls on the lower transducer support, and thus prevent corners of the transducer from unintentionally engaging the data disc jacket.

When arm 258 is lowered, the upper transducer support A descends until it rests solidly against its three supports 216, 208 and 210. The upper transducer is now positioned at the disc surface and this transducer becomes what has been heretofore in the prior art referred to as the fixed transducer.

When arm 256 is lowered, the lower transducer support B rises due to the bias of springs 244 and 246 and the lower transducer contacts the disc surface. This lower transducer becomes what has been heretofore in the prior art referred to as the movable, spring biased transducer.

The upper transducer establishes then, the vertical point of contact. The spring biasing of the lower transducer brings it upward, and the flexible recording media with it if necessary, until all three elements are in contact. Since the upper transducer is not gimbal mounted but only pivotally mounted, it also establishes an angular constraint along the axis drawn through balls 16 and 18. This angular constraint is at right angles to the pivots of the lower transducer, therefore the lower transducer is able to pivot until it conforms to the angle of the upper transducer. Similarly, the lower transducer is angularly constrained along an axis at right angles to the pivots of the upper transducer, therefore the upper transducer is able to pivot until it conforms to the angle of the lower transducer.

To summarize, each transducer provides one degree of angular constraint, the upper transducer provides vertical position, the lower transducer provides magnitude of clamping force, and the flexible media is fully constrained in the middle. By this method a transducer support apparatus is provided which provides a single fixed geometry during data transfer operations.

What is claimed is:

1. Apparatus for supporting and aligning a pair of magnetic transducers in operative relationship on opposite sides of a pliant rotatable magnetic disc comprising:
   (A) a first transducer support arm;
   (B) a second transducer support arm;
   (C) a carriage means for carrying said first and second support arms;
   (D) means biasing said first and second arms toward each other and toward said carriage means
   (E) means carried by said carriage means for adjusting the position of one of said support arms relative the other to align said transducers by moving one transducer along a radial line relative to said magnetic disc and along a line transverse to said radial line and parallel to said disc; and
   (F) said first transducer support arm and said second transducer support arm being on opposite sides of said magnetic disc.

2. Apparatus as defined in claim 1 which further includes means for simultaneously moving said support arms away from each other to permit positioning of a magnetic disc therebetween.

3. Apparatus as defined in claim 2 wherein said simultaneously moving means includes first and second extensions on said first and second arms respectively.

4. Apparatus as defined in claim 3 which further includes means for exerting force on said extensions to move said support arms apart.

5. Apparatus as defined in claim 1 wherein said adjusting means includes a first member for positioning said second transducer support arm along said radial line and a second member for transversely positioning said second transducer support arm relative said radial line.

6. Apparatus as defined in claim 5 wherein said first member includes a plate pivotally mounted on said carriage means, a first adjuster member extending through said carriage means into engagement with said plate at a point displaced from said pivotal mount to impart rotational movement of said plate about said pivotal mount responsive to movement of said first adjuster member, and means coupling said plate to said first transducer support arm for imparting translational movement thereto responsive to said rotational movement of said plate.

7. Apparatus as defined in claim 6 wherein said pivotal mount between said plate and said carriage means includes a ball and socket and wherein said plate is spring biased toward said carriage means and against said first adjuster member.

8. Apparatus as defined in claim 7 wherein said plate defines first and second spherical surfaced protrusions thereon and said carriage means defines first and second depressions for receiving said first and second protrusions thereby to define said ball and socket pivoted mount.

9. Apparatus as defined in claim 5 wherein said second member includes a finger pivotally mounted between said second transducer arm and said carriage means, a second adjuster member extending through said carriage means into engagement with said finger at a point displaced from the pivotal mount thereof to impart rotational movement of said finger about said pivotal mount thereof responsive to movement of said second adjuster member.

10. Apparatus as defined in claim 9 which further includes means coupling said finger to said first member.

11. Apparatus as defined in claim 10 which further includes spring means biasing said finger against said carriage means, said second adjuster member and said first member.

12. Apparatus as defined in claim 9 wherein said pivotal mount between said finger and said second transducer support arm includes curved surface defining means at each end of said second transducer support arm and defining an axis about which said second support arm may pivot, and which further includes spring means disposed on each side of said axis for biasing said second support arm toward said finger and said carriage means, said spring means causing said magnetic transducer to be urged toward said disc.

13. Apparatus as defined in claim 12 which further includes means counterbalancing said second support arm for controlling the amount of force exerted on said disc by said transducer.

14. Apparatus as defined in claim 13 wherein said force is on the order of about 5 grams.

15. Apparatus as defined in claim 12 wherein said curved surface defining means includes first and second spheres and wherein said second transducer support arm defines first and second depressions for receiving said first and second spheres.

16. Apparatus as defined in claim 15 wherein said spheres are stainless steel balls.

17. Apparatus as defined in claim 16 wherein said stainless steel balls are cemented in place in said depressions.

18. Apparatus as defined in claims 6 or 9 wherein said first and second members include screws threadably received in said carriage means, threads in said carriage means and on said screws at least partially interfering to retain said screw in place after adjustment thereof.

19. Apparatus as defined in claim 1 wherein said carriage means, said support arms, and said adjusting means have substantially the same thermal coefficient of expansion and contraction as the magnetic disc.

20. Apparatus as defined in claim 1 wherein said carriage means, said support arms, and said adjusting means have substantially the same hygroscopic coefficient of expansion and contraction as the magnetic disc.

21. Apparatus as defined in claims 19 or 20 wherein said carriage means, said support arms, and said adjusting means are substantially molded plastic members.

22. Apparatus as defined in claims 19 or 20 wherein said carriage means, said support arms and said adjusting means are molded plastic members constructed of fiberglass filled polycarbonate plastic.

23. Apparatus as defined in claim 1 which further includes means on said carriage means for retaining said first support arm in a non-adjustable relationship with respect thereto.

24. Apparatus as defined in claim 18 wherein said adjusting means includes means carried by said carriage means for adjusting the position of said second support arm with respect to said carriage means.

25. Apparatus as defined in claim 24 wherein said adjusting means is accessible from the exterior of said carriage means.

26. Apparatus as defined in claim 25 wherein said carriage means includes a fin like member extending therefrom and said first support arm defines a slot therethrough, said fin extending through said slot to mitigate movement of said support arm responsive to shock.

* * * * *